United States Patent [19]
McCaul

[11] 3,770,100
[45] Nov. 6, 1973

[54] ARTICLE SORTING APPARATUS

[75] Inventor: Edward W. McCaul, Bloomfield Hills, Mich.

[73] Assignee: Jervis B. Webb Company, Detroit, Mich.

[22] Filed: July 18, 1972

[21] Appl. No.: 272,987

[52] U.S. Cl. .............................................. 198/38
[51] Int. Cl. ............................................ B65g 43/08
[58] Field of Search ..................... 198/31 AC, 38; 214/11 R, 11 A

[56] References Cited
UNITED STATES PATENTS
1,871,902   8/1932   Mojonnier ....................... 198/38 X Primary Examiner—Edward A. Sroka
Attorney—Farley, Forster and Farley

[57] ABSTRACT

Article sorting apparatus having a plurality of recirculating carriers on which articles are placed at a loading station and are forwarded to a selected one of several discharge stations arranged along a discharge zone. Each carrier is supported for movement transversely to the forwarding direction and has a guide member engaging a guide track which defines the transverse carrier position. Along the discharge zone, the guide tracks define a conveying lane and a discharge lane of forward movement for the carriers, the discharge lane being spaced transversely from and being connected to the conveying lane in advance of each discharge station by an independently selectable branch lane. Each discharge station is equipped with a fixed type of diverter which extends obliquely across the discharge lane in the path of article travel and above the path of carrier travel. Following the discharge zone, the guide track defines a single return lane of travel for all carriers to a junction in the guide track, in advance of the loading station, where the carriers are switched alternately to one of a pair of transversely spaced loading lanes. Induction mechanism at the loading station enables articles to be coded to a desired discharge station and advanced in timed relation with the arrival at the loading station of alternate carriers in the loading lanes. The guide tracks following the loading station merge the loading lanes into the conveying lane on which all carriers enter the discharge zone.

19 Claims, 8 Drawing Figures

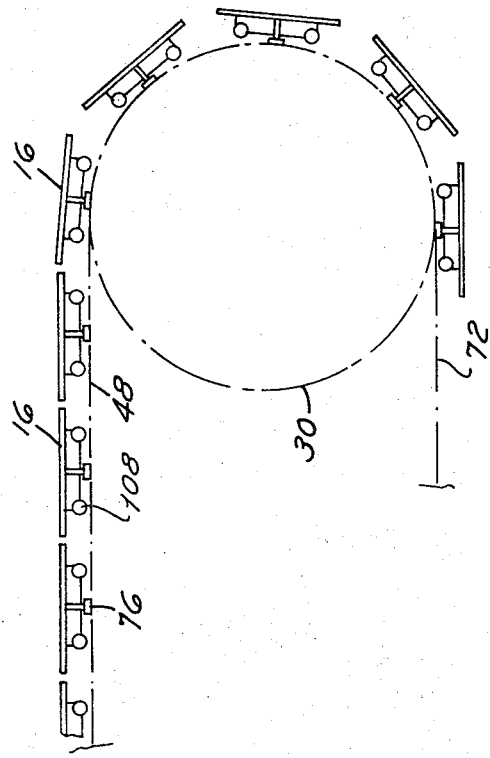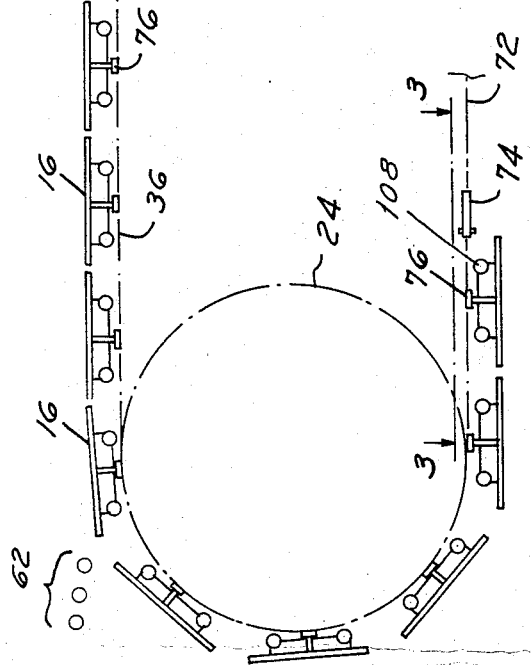
FIG. 2

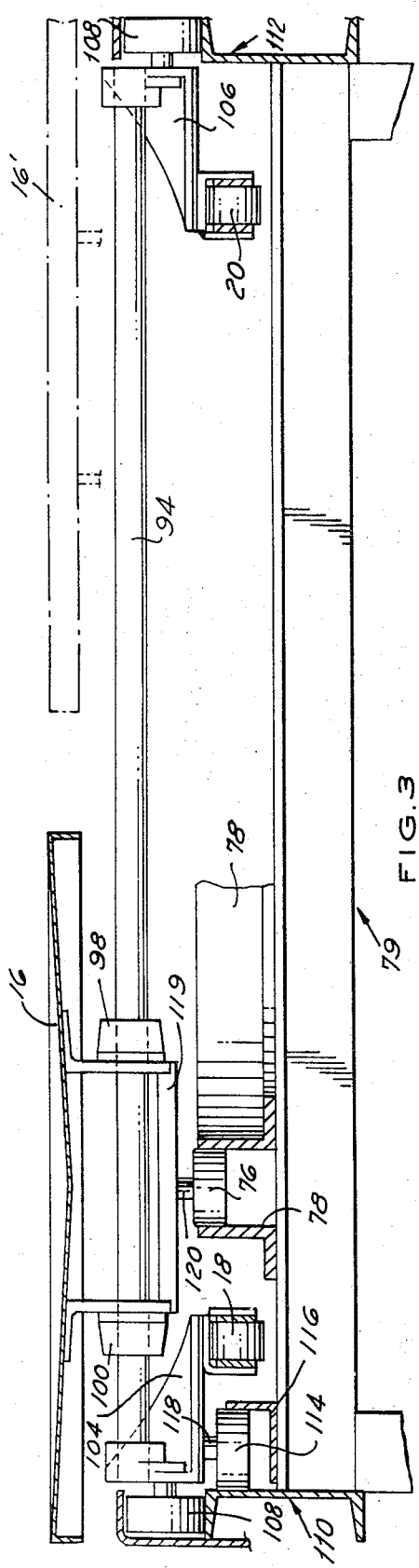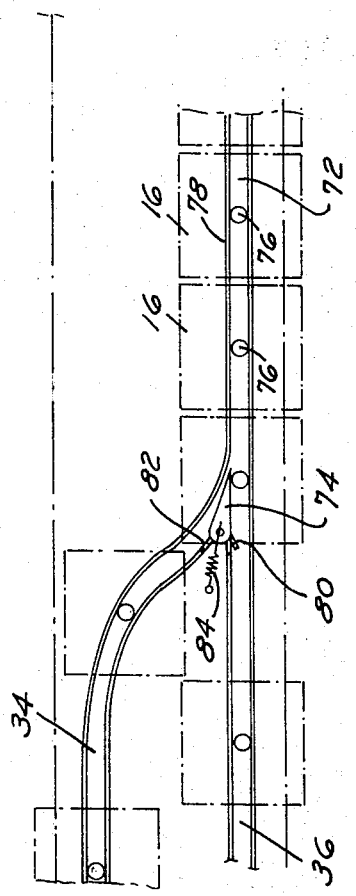

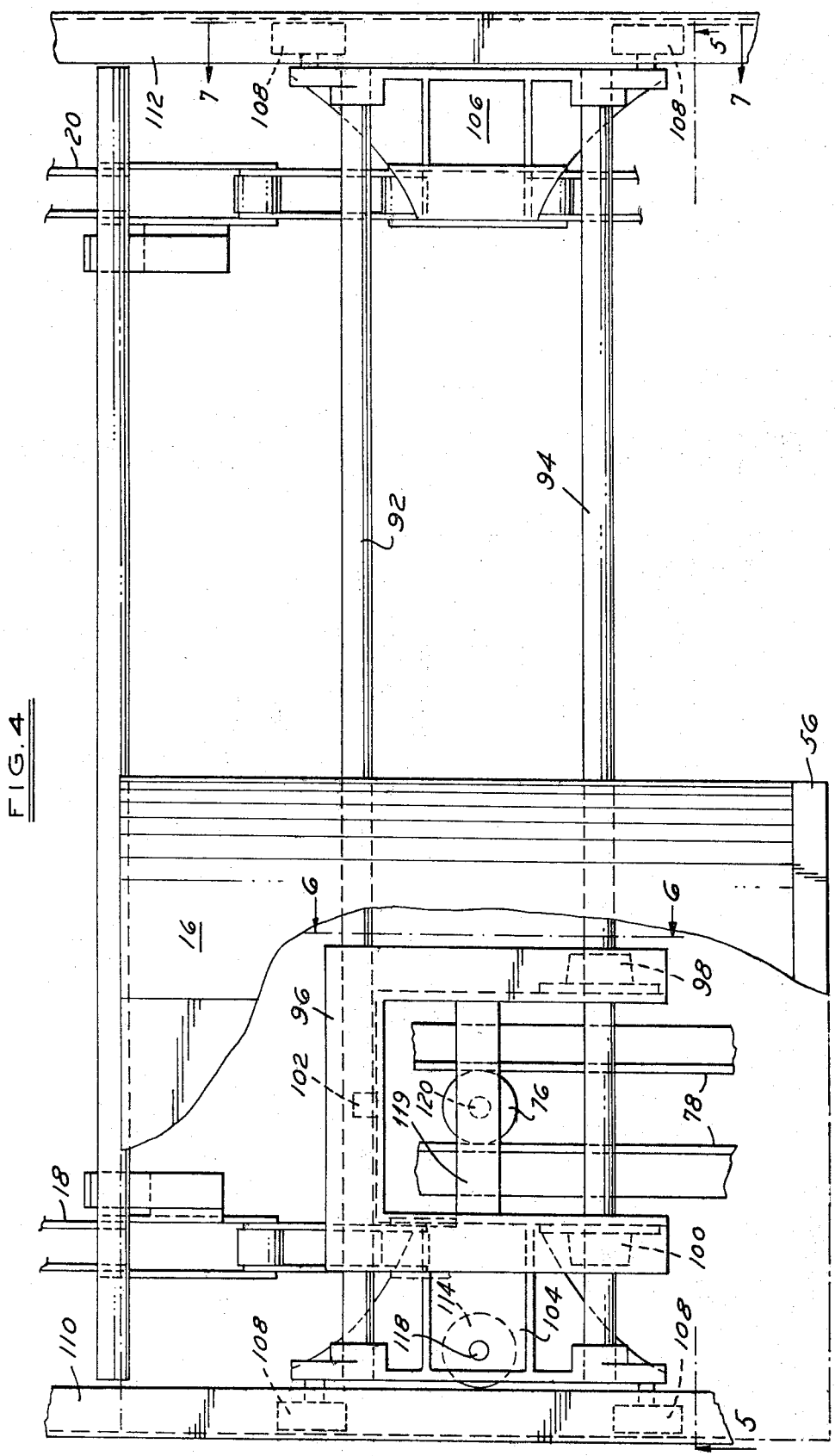

ARTICLE SORTING APPARATUS

SUMMARY OF THE INVENTION

This invention relates to article sorting apparatus of the type having a plurality of carriers on which articles are placed at a loading station and conveyed to a plurality of discharge stations where the articles are automatically unloaded, each at a selected one of the discharge stations.

Prior sorting apparatus of this type has generally employed either carriers which can be automatically tilted at a selected discharge station for the unloading of articles, or movable diverters at the discharge stations which can be selectively introduced into the path of article travel to cause the removal of articles, usually with a sweeping action. Both of these prior types of sorting apparatus impose limitations on the speed at which the sorting operation can be carried on without the likelihood of damage to the articles being sorted. In the first type of apparatus — the so-called "tilting tray" sorter — the tilting motion of the article carrying trays becomes more abrupt as the speed of forward movement increases, and the resulting discharging movement of articles becomes more violent, excessive and damaging. The movable diverters of the second type of apparatus also must move in proportion to the speed of the sorting operation, and impose a further limitation thereon because of the time that must be provided in order to move a diverter to and from diverting position without interference with articles other than the particular one whose diversion has been selected.

In prior sorters of either type mentioned above, the articles usually travel in single file from the loading station through the discharge stations, and this imposes an additional time limitation where articles must be individually coded at the loading station for a particular discharge station.

The present invention provides article sorting apparatus which permits higher sorting speeds to be obtained by reducing the possibility of article damage in the unloading operation at the discharge stations, and by increasing the time available at the loading station in installations where a coding operation is required for each article.

The article sorting apparatus of the invention has conveying means including a plurality of carriers on which articles are placed at a loading station and conveyed in a forward direction to a discharge zone. Each carrier is supported on the conveying means for movement transversely to the forward direction independently of each other carrier, and guide means engageable by each carrier defines the transverse position thereof. Along the discharge zone, the guide means defines at least two parallel transversely spaced lanes of movement for the carriers in the forward direction, one lane being a conveying lane on which all carriers enter the discharge zone and the other lane being a discharge lane having a plurality of discharge stations located at spaced intervals therealong. The guide means further defines a plurality of independently selectable branch lanes extending from the conveying lane to the discharge lane, each branch lane being arranged in advance of one of the discharge stations. Thus, the function of conveying articles in a forward direction from the loading station is separated from the function of unloading an article at a selected discharge station, and the discharge stations are each provided with article unloading means most suitable for the speed of operation and size or type of article.

Preferably, the unloading means at each discharge station comprises a diverter extending obliquely in fixed relation across at least a portion of the discharge lane so as to intercept and cause the discharge of an article from a carrier, the carrier passing under the diverter, and the diverter may further include a continuous driven member, such as a belt, which engages and moves an article in the discharging direction.

Where additional time is required at the loading station for coding each article, the guide means are further arranged to provide at least a pair of transversely spaced loading lanes of movement for the carriers at the loading station. Successive carriers are automatically positioned alternately in these loading lanes, and induction means provided at the loading station enable the alternate loading of articles in each of the loading lanes.

Further features and advantages of the invention will appear from the description to follow of the representative embodiment disclosed in the accompanying drawings.

DESCRIPTION OF THE DRAWINGS

FIG. 2 is a schematic side elevation showing the conveying means and carriers of the apparatus of FIG. 1;

FIG. 3 is an enlarged fragmentary plan view of the guide means taken as indicated by the line 3—3 of FIG. 2;

FIG. 4 is an enlarged plan view showing one carrier and the supporting and conveying means therefor;

FIG. 5 is a transverse sectional elevation taken along the line 5—5 of FIG. 4;

DESCRIPTION OF THE PREFERRED EMBODIMENT

Figure 1:
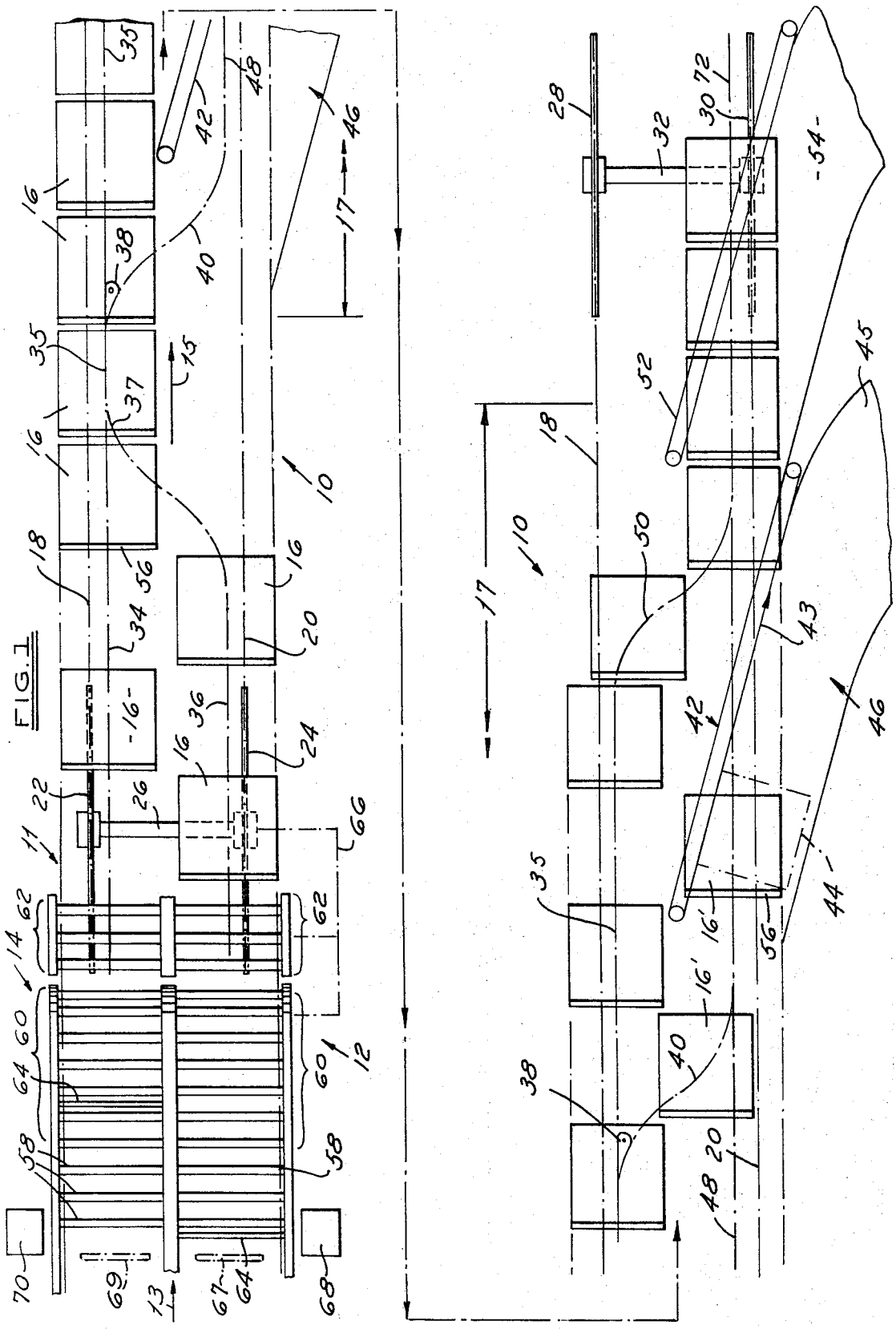
FIG. 1 is a schematic plan view of the article sorting apparatus of the invention including induction means at a loading station and a plurality of selectable discharge stations.
Figure 6:
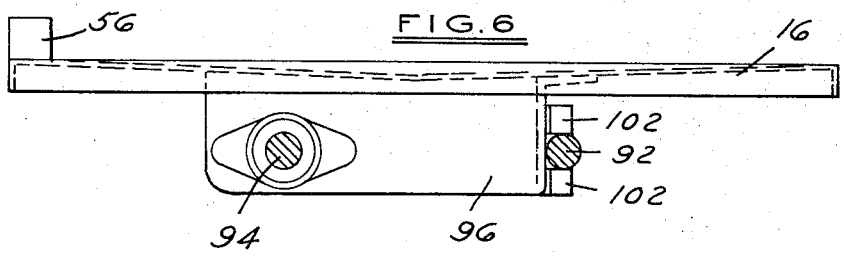
FIG. 6 is a longitudinal sectional elevation taken on the line 6—6 of FIG. 4.
Figure 7:
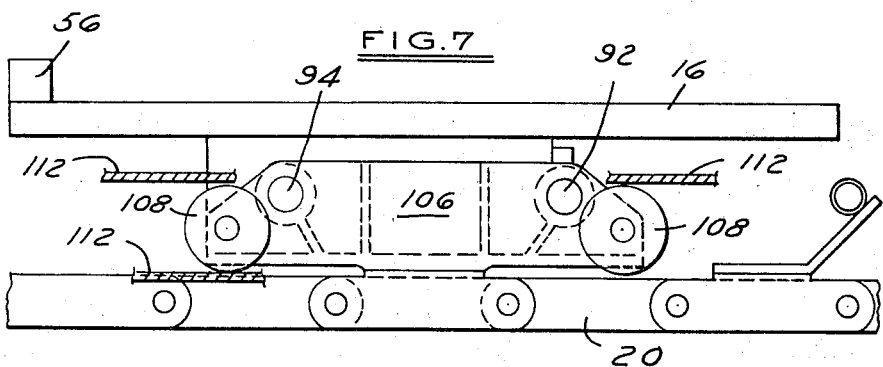
FIG. 7 is a longitudinal sectional elevation taken on the line 7—7 of FIG. 4; and, FIG. 8 is an enlarged plan view of the automatic alternating switch shown in FIG. 3.

The article sorting apparatus illustrated in FIGS. 1 and 2 consists of conveying means 10 having a plurality of carriers 16 on which articles are placed at a loading station 11 by induction means 13 which advance articles to the loading station along a pair of loading lanes 12 and 14 with the loading operation alternating between the lanes in a manner to be hereinafter described. Articles placed on the carriers 16 are conveyed in a forward direction 15 to a discharge zone 17.

The conveying means 10, or sorting conveyor portion of the apparatus, includes a pair of transversely spaced endless chains 18 and 20 trained about sprockets 22 and 24 mounted on a shaft 26 adjacent the loading station 11 and about a second pair of sprockets 28 and 30 mounted on a shaft 32 at the other end of the conveyor. One of the shafts 26 or 32 is suitably driven by a conventional type of driving unit (not shown) so that the chains move in unison in forward and return directions.

Each of the carriers 16 is supported for movement transversely to the forward and return directions independently of each other carrier by supporting means (shown in detail in FIGS. 4–7) which include a pair of transversely parallel, longitudinally spaced, supporting bars 92 and 94, each carrier 16 including a frame 96 movable on the supporting bars 92 and 94 which in turn are interconnected with the chains 18 and 20.

The frame 96 of each carrier is provided with a pair of transversely spaced bearings 98 and 100 slidably engaging the supporting bar 94, and with a single bearing 102 which may be formed by guide blocks as shown, slidably engaging the supporting bar 92. The supporting bars 92 and 94 are secured to a pair of trolleys 104 and 106, each trolley having wheels 108; and, the wheels of the trolley 104 ride on a track 110 at the left hand side of the conveyor and the wheels of the trolley 106 ride on a track 112 at the right hand side of the conveyor, as viewed in FIGS. 4 and 5. These trolleys 104 and 106 are connected to and support the chains 18 and 20, and one of the trolleys 104 is provided with a guide roller 114 rotatably mounted on an axle 118 and engaging a guideway formed by a track member 116 and a vertical flange of the track 110.

The transverse position of each carrier 16 on its pair of supporting bars 92 and 94 is defined by guide means engageable by a guide roller 76 rotatably mounted on an axle 120 depending from a cross member 119 of the frame 96, the guide means including a track formed by track members 78 carried by frame structure 79 of the sorting conveyor, as shown in FIG. 5.

Referring again to FIG. 1, the track members of the guide means are arranged to define a pair of transversely spaced loading lanes of movement 34 and 36 for the carriers at the loading station 11, these lanes being aligned with the loading lanes 14 and 12 of the induction means, and successive carriers 16 are positioned alternately in these loading lanes, as shown, by means to be described below. Following the loading station, the guide means are arranged to merge the loading lanes 36 and 34 into a single conveying lane 35 at a junction 37 in advance of the discharge zone 17 of the sorting conveyor so that all carriers enter the discharge zone in single file along the conveying lane 35.

Along the discharge zone 17, the guide means are arranged to define a discharge lane 48 parallel to and spaced transversely from the conveying lane 35, and a plurality of discharge stations 46 are located along the discharge lane 48. The guide means further defines a plurality of independently selectable branch lanes 40 extending from the conveying lane 35 to the discharge lane 48, each branch lane 40 being arranged in advance of one of the discharge stations 46 and being selectably connectable to the conveying lane 35 by operation of a switch 38.

Following the last of the discharge stations 46, the guide means includes a portion 50 merging the conveying lane 35 into the discharge lane 48 to form a single return lane 72. A final discharge station 54 may be provided following this merger of the conveying and discharge lanes to serve either as a station at which articles may be selectively discharged or as a station where articles that have been miscoded may be gathered.

Figure 8:
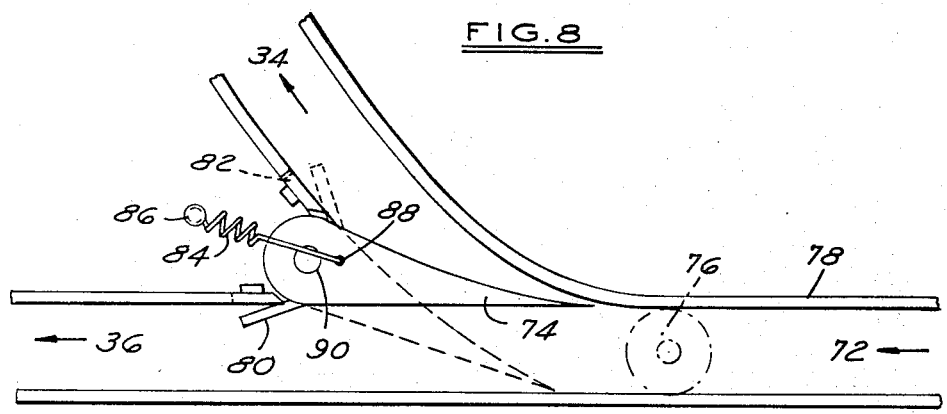

All carriers 16 recirculate back toward the loading station 11 on the return lane 72 to the junction therein shown in FIGS. 3 and 8. Following this junction, the guide means defines the two transversely spaced loading lanes of carrier travel 34 and 36, and a diverter 74 at the junction provides a means for automatically positioning successive carriers 16 alternately in the loading lanes 34 and 36, the diverter 74 being mounted on a pivot 90 and being provided with a pair of laterally projecting cams 80 and 82. When the diverter 74 is in the position shown in full line (FIG. 8), one of the cams 80 projects into the path of travel of a carrier guide roller 76 along the loading lane 36 and is engageable thereby to cause the diverter to move to the position shown in broken line, in which the other cam 82 projects into the path of travel of a guide roller of a successive carrier along the loading lane 34 and when engaged thereby causes the diverter to return to the full line position. This flip-flop action of the diverter 74 is augmented by a spring 84 mounted between connections 86 and 88 on the conveyor frame structure and diverter 74, respectively, in over-center relation to the axis of the pivot 90.

As successive carriers pass through the loading station 11 alternately positioned in the loading lanes 34 and 36, an article is automatically placed on each carrier by the alternating advance of articles along the loading lanes 14 and 12 of the induction means 13. The induction means includes a pair of side-by-side roller conveyors each consisting of a group of powered rollers 58 followed in the forward direction of article movement by a group of unpowered rollers 60. A pusher bar 64 is driven along a path above the article supporting plane defined by the rollers 58 and 60 and positively advances an article onto a final group of powered rollers 62 which may be downwardly inclined as shown in FIG. 2. The powered rollers 58 and 62 and the pusher bars 64 are driven in synchronism with the conveyor chains 18 and 20 by suitable schematically illustrated drive connections 66.

Conventional conveyors (not shown) are employed to forward articles to be sorted to coding stations 68 and 70 where forwarding movement is arrested by a suitable stopping device 67 in the loading lane 12 adjacent the coding station 68 and by a stopping device 69 in the loading lane 14 adjacent the coding station 70. Suitable controls available to those skilled in the art may be employed to automatically and alternately release the stopping devices 67 and 69 in response to the performance of a coding operation at their respective coding stations 68 and 70 in properly timed relation to the advance of the pusher bars 64 which are alternately arranged in the forwarding lanes. When one of the stopping devices 67 or 69 is operated to release an article that has been coded, the ensuing advancing movement of the article is accelerated by the powered rollers 58 to clear the released article from the stopping device and a following article. As the released article engages the unpowered group of rollers 60, the advancing movement is decelerated and the article is overtaken by a pusher bar 64 which advances the article unto the powered rollers 62 in timed relation with the arrival of an article carrier 16.

Although not illustrated, it will be understood that the coding stations 68 and 70 are employed in combination with either a parasitic or escort type of coding system which will cause one of the switches 38 along the conveying lane 35 to be actuated at the proper time to divert a carrier to the particular discharge station 46 selected by the coding operation. The induction means and loading arrangement shown and described is intended primarily for installations where a relatively high speed operation of the sorting conveyor 10 is desired and a manual coding operation is required for each article, the alternating loading sequence of articles in the pair of loading lanes making it possible to employ the pair of coding stations 68 and 70 and to thereby increase the available time for properly coding each article individually. In other installations, articles may be coded at a location or locations remote from the sorting operation and in such a manner that the code placed on each article may be automatically sensed by a code reader forming part of the coding system for the sorting conveyor 10. In such an installation, it may be possible to eliminate the alternating loading sequence illustrated and described herein and to arrange the guide means of the sorting conveyor so that all carriers pass through the loading station in single file in a lane which corresponds to the conveying lane 35 disclosed.

As shown in FIG. 1, unloading means 42 are provided at each of the discharge stations 46, and for high speed operation, the unloading means consists of a diverter in the form of an endless belt 43 driven in the direction of article unloading movement and mounted so as to extend obliquely across the discharge lane 48 in fixed relation thereto above the level of a carrier 16 which has been switched to the discharge lane 48, but intersecting the path of movement of an article 44 on such a carrier 16. The oblique positioning and driving action of the belt 43 produce a discharging movement of the article 44 forwardly and laterally onto a discharge chute 45, this movement being insured by the provision of an upwardly projecting lip or flange 56 along the rearward edge of each carrier 16 for retaining the article in engagement with the diverter as the carrier moves along the discharge lane. A similar endless belt diverter 52 is installed at the final discharge station 54. All of the carriers 16 pass under this diverter 52 so that all carriers are empty at the beginning of their return to the loading station.

It will be appreciated from the foregoing that the sorting conveyor of the invention enables the conveying of articles from a loading station to a discharge zone to be separated from the discharge of articles along such zone and permits the use of fixed diverters at each discharge station which are capable of discharging articles from the carriers at reslatively high speeds without undue shock or violent article movement and with minimum likelihood of article damage. Further, the arrangement of segregating a conveying lane from a discharge lane enables a single conveying lane to be employed with dual discharge lanes, one on either side of the conveying lane, and to thereby increase the number of discharge stations which can be provided for a given length of sorting conveyor. Other modifications not disclosed herein, but within the scope of the appended claims, are to be considered a part of the present invention.

I claim:

1. Article sorting apparatus having conveying means including a plurality of carriers on which articles are placed at a loading station and conveyed in a forward direction to a discharge zone; wherein the improvement comprises:

means supporting each carrier on the conveying means for movement transversely to the forward direction independently of each other carrier;

guide means engageable by each carrier for defining the transverse position thereof, the guide means being arranged along at least a portion of the discharge zone to define at least two parallel transversely spaced lanes of movement for the carriers in the forward direction, one lane being a conveying lane on which the carriers enter the discharge zone and the other lane being a discharge lane having a plurality of discharge stations, the guide means further defining a plurality of independently selectable branch lanes extending from the conveying lane to the discharge lane, each branch lane being arranged in advance of a discharge station; and, article unloading means at each discharge station.

2. Article sorting apparatus according to claim 1 wherein the guide means are further arranged following the last of the selectable branch lanes to merge the conveying lane and the discharge lane into a single return lane of movement for carriers from the discharge zone toward the loading station.

3. Article sorting apparatus according to claim 2 further including a junction in the single return lane in advance of the loading station, the guide means defining two transversely spaced loading lanes following the junction, and diverting means at the junction for positioning successive carriers alternately in the loading lanes, the guide means following the loading station and in advance of the discharge zone being arranged to merge the loading lanes into said conveying lane.

4. Article sorting apparatus according to claim 1 wherein said guide means are further arranged to provide at least a pair of transversely spaced loading lanes of movement for the carriers at the loading station and include means for positioning successive carriers alternately in these loading lanes, the guide means merging these loading lanes into the conveying lane in advance of the discharge zone.

5. Article sorting apparatus according to claim 4 further including induction means at the loading station for loading articles on carriers in each of said loading lanes.

6. Article sorting apparatus according to claim 5 wherein the induction means includes a pair of induction conveyors operable to advance articles to the loading station in synchronism with the arrival of carriers at the loading station in each loading lane.

7. Article sorting apparatus according to claim 6 wherein each induction conveyor includes an article pusher member.

8. Article sorting apparatus according to claim 5 wherein the induction means includes a coding station for each loading lane.

9. Article sorting apparatus according to claim 1 wherein the means supporting each carrier on the conveying means includes carrier supporting structure connected to and extending transversely of the conveying means and means movably mounting the carrier on such supporting structure.

10. Article sorting apparatus according to claim 9 wherein the conveying means includes a pair of transversely spaced chains, and the supporting structure for each carrier includes a pair of transversely parallel longitudinally spaced supporting bars, each carrier including a frame movable on the supporting bars.

11. Article sorting apparatus according to claim 10 further including a pair of transversely spaced trolleys secured to each pair of supporting bars, a track engageable by each trolley, and means connecting each conveyor chain to one of the trolleys.

12. Article sorting apparatus according to claim 11 wherein each carrier is equipped with a depending guide member engageable with said guide means.

13. Article sorting apparatus according to claim 1 wherein said guide means includes a track defining the conveying lane, the discharge lane and each branch lane, a selectably operable switch between each branch lane and the conveying lane, and a guide member on each carrier engageable with the track.

14. Article sorting apparatus according to claim 1 wherein the article unloading means at each discharge station comprises a diverter extending obliquely across at least a portion of the discharge lane in fixed relation thereto, the diverter being mounted above the level of a carrier moving along the discharge lane but intersecting the path of movement of an article on such carrier.

15. Article sorting apparatus according to claim 14 wherein the article unloading means includes a driven member adapted to engage and move an article laterally from a carrier in the discharge lane.

16. Article sorting apparatus according to claim 14 wherein each carrier includes means for retaining an article in engagement with the diverter as the carrier moves along the discharge lane.

17. Article sorting apparatus according to claim 16 wherein the diverter includes a driven member engageable by an article and movable in the direction of article unloading movement.

18. Article sorting apparatus according to claim 17 wherein the driven member comprises an endless belt.

19. Article sorting apparatus according to claim 1 in which the conveying means comprises a pair of endless chains and longitudinally spaced pairs of sprockets about which the chains are trained, each pair of sprockets being mounted on a common axis;

the means supporting each carrier including a pair of parallel bars extending transversely of the chains, a pair of transversely spaced trolleys connected to each pair of parallel bars, a track supporting each trolley, and means connecting each chain to one of the trolleys for support thereby, each carrier including a frame slidably supported by the pair of parallel bars;

said guide means including track members mounted between said trolley tracks and engageable by a guide member projecting from each carrier.

* * * * *